United States Patent [19]
Lafferty

[11] Patent Number: 5,873,130
[45] Date of Patent: Feb. 23, 1999

[54] WRIST GUARD FOR SNOWBOARDING

[76] Inventor: Michael Lafferty, 324 Free Silver Ct., Aspen, Colo. 81611

[21] Appl. No.: 996,443

[22] Filed: Dec. 22, 1997

[51] Int. Cl.[6] .................................................. A41D 13/08
[52] U.S. Cl. .......................... 2/16; 602/21; 2/459; 2/170; 473/59
[58] Field of Search ..................... 2/20, 161.1, 161.6, 2/159, 162, 161.7, 160, 167, 168, 169, 170, 16, 19; 473/59, 62; 602/21, 5, 6, 27, 22, 23

[56] References Cited

U.S. PATENT DOCUMENTS

| 4,168,063 | 9/1979 | Rowland . | |
|---|---|---|---|
| 4,190,906 | 3/1980 | Patton, Jr. . | |
| 4,228,548 | 10/1980 | Cohen . | |
| 4,407,499 | 10/1983 | Newton . | |
| 4,441,711 | 4/1984 | Dubar et al. . | |
| 4,531,241 | 7/1985 | Berger . | |
| 5,313,667 | 5/1994 | Levine . | |
| 5,404,591 | 4/1995 | Brinnand et al. . | |
| 5,445,566 | 8/1995 | Hayes | 2/161.1 X |
| 5,513,657 | 5/1996 | Nelson | 602/20 X |
| 5,537,692 | 7/1996 | Dorr . | |
| 5,708,981 | 1/1998 | Tilton | 2/170 |
| 5,713,837 | 2/1998 | Grim et al. | 602/21 X |
| 5,728,059 | 3/1998 | Wiesemann et al. | 602/21 X |
| 5,759,166 | 6/1998 | Nelson et al. | 602/21 |

Primary Examiner—Gloria M. Hale
Attorney, Agent, or Firm—Niro, Scavone, Haller & Niro

[57] ABSTRACT

A one-piece wrap-around wrist guard is provided that includes a plurality of flexible plastic supports or stays positioned above and below the wrist. The wrap-around support structure helps absorb and distribute forces from a fall rather than transmitting them to the wrist, arm, elbow and shoulder.

10 Claims, 1 Drawing Sheet

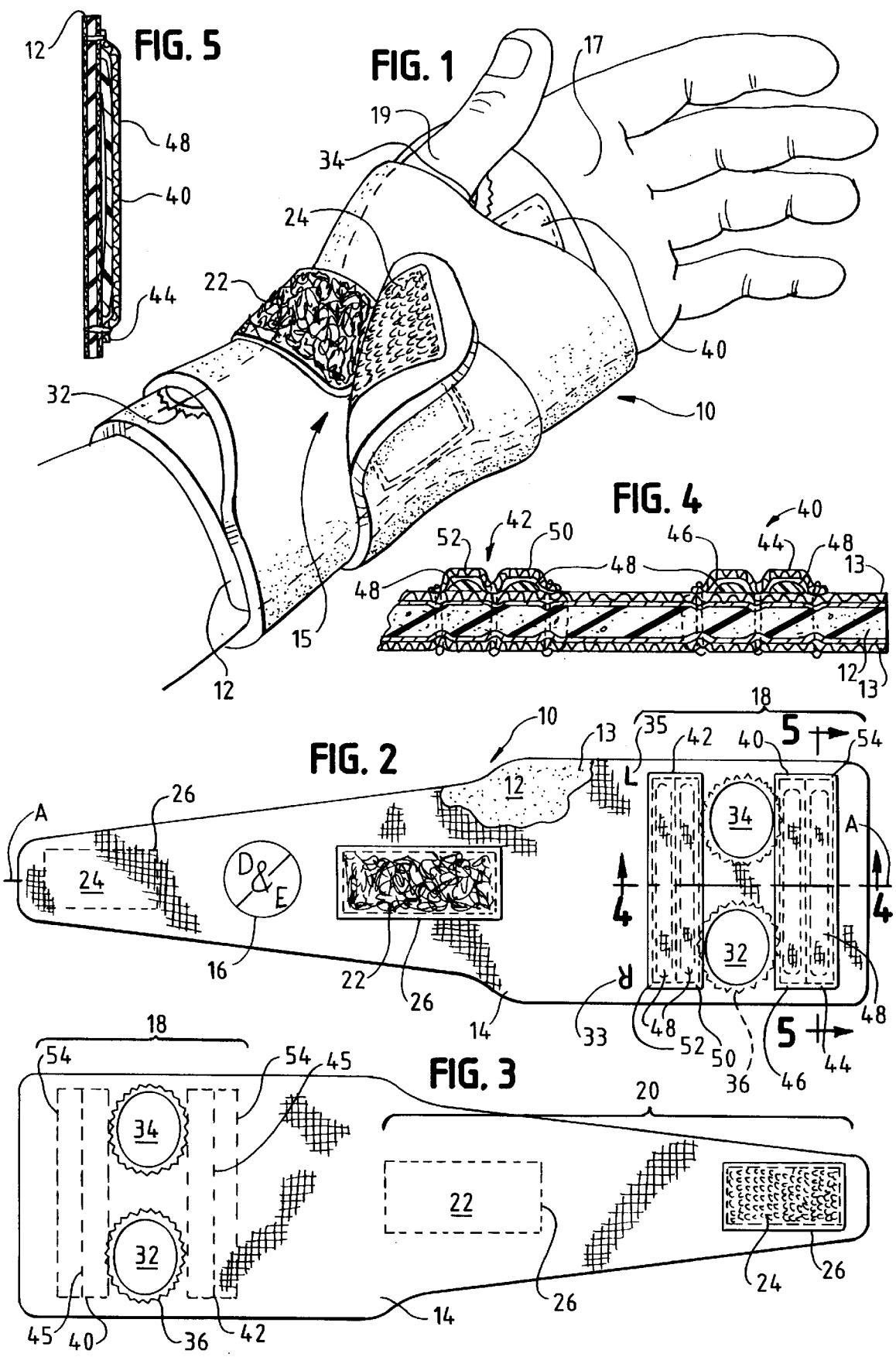

WRIST GUARD FOR SNOWBOARDING

BACKGROUND OF THE INVENTION

Snowboarders are frequently injured from falls. This invention relates to a wrist support and more particularly to an adjustable wrist guard that may be worn by a snowboarder interchangeably on either the right or left hand that provides flexible, shock-absorbing support to the user's wrist in the unfortunate event of a fall.

Snowboarders suffer an extraordinary number of wrist injuries because they instinctively extend their arms to brace for impact during a fall. Because of the large number of falls that occur for even experienced snowboarders, a high incidence of wrist injuries exists. A beginning snowboarder, for example, can fall between 10 and 30 times per day; a more-experienced snowboarder, between 2 and 10 times per day. The most common injuries are wrist sprains, breaks or bruises. Indeed, wrist injuries are becoming such a common occurrence that it detracts from the enjoyment of the whole snowboarding experience. Some ski resorts now even require the mandatory use of wrist protection for persons learning how to use a snowboard.

Snowboarding is presently the fastest growing alpine winter sport in the United States. With a greater number of national ski areas permitting snowboarders to share the same lift serviced terrain as downhill skiers, the number of active participants has mushroomed, particularly in the under 25 years of age group. Snowboarding is analogous to "surfing on the snow". The snowboarder typically wears either "soft-shell" or "rigid-shell" boots, similar to those used with downhill ski equipment, either of which are rigidly secured to a pair of plate bindings, the forward one disposed axially and the rear one disposed transverse on the upper surface of the snowboard. Unlike downhill ski equipment which utilizes releasable bindings that are actuated upon the skier's leg encountering a given twisting or pulling load during a fall, snowboard bindings do not release unless manually activated by the snowboarder when removal of the board or one foot (when boarding lifts) is desired. Consequently, the snowboard is always anchored to the rider's feet during use and there is no independent leg movement as in skiing. Since both legs are attached to one board, the type of falls typically encountered by a snowboarder are markedly different from those a downhill skier may face. In snowboarding, the rider's feet are locked and, hence, the falls are less of a sliding fall where the feet can separate. Stops tend to be immediate to either the front or back, e.g., heel-side or toe-side edges of the board. In contrast, a skier's feet can separate during a fall which results in more side falls. As a result, snowboarders tend to fall more to their hips, rather than straight forward or backward. It is wrist protection for the type falls experienced by snowboarders that the present invention is directed.

Two approaches to providing wrist protection to snowboarders are shown in U.S. Pat. Nos. 5,313,667 and 5,537,692. The '667 patent utilizes four separate straps that selectively interconnect around a hand. Because separate straps are used, they can be difficult to use. In addition, such systems use rigid, non-shock-absorbing stays or supports. The '662 patent discloses a rigid wrist protection device that is incorporated within the lining of a glove to preserve the ornamental qualities of the glove. It also uses rigid, rather than flexible, supports. Neither the '667 patent nor the '692 patent teach the benefits of having multiple, narrow, flexible wrist-support plates that absorb, rather than transmit, forces or the unique wrap-around strap or the ability to wear the present invention on either the left or right hand.

Embodiments of the present invention may be worn interchangeably either over or under a glove and incorporate multiple symmetric thumb-holes and a wrap-around strap which positions a plurality of flexible support members as snugly as possible to the user's wrist. Further, the wrist guard is easy to put on and take off while, at the same time, offering more support and shock absorption than the prior art wrist protection devices.

SUMMARY OF THE INVENTION

The snowboarder's wrist guard of the present invention provides protection to the wrist in the event that the snowboarder falls while riding the snowboard. The single-piece wrist guard of the present invention has a plurality of thumb holes in the wrap that add stability to the wrist guard and prevent it from moving during use. Additionally, the placement of the thumb holes permits the wrist guard to be worn interchangeably, on either the left or right hand. Thus, the wrist guard can be put on backwards or forward and still provide wrist protection.

On both sides of the thumb holes are wrist supports comprising a plurality of narrow and relatively flexible, shock-absorbing support members. By preferably using a plurality of narrow, shock-absorbing support members, the wrist guard can more precisely conform to the user's hand, thus, lending greater flexibility and support. The positioning of the plurality of narrow support members also permits the wrist guard to conform to various-sized hands. The length of the wrap permits the wrap to fit over a glove and further allows for 720° coverage of the hand giving extra warmth and added support to the snowboarder.

Accordingly, it is an object of the present invention to provide a new and improved wrist guard for snowboarders that absorbs, rather than transmits, shock.

Another object of the present invention is to provide an interchangeable wrist guard that may be worn on either the left or right hand of a snowboarder.

Still another object of the present invention is to provide a pair of thumb grips that secure the wrist guard to either one of the snowboarder's wrists.

Yet still another object of the present invention is to have a plurality of support points relative to members that provide support and stability along both the inside portion and outside portion of the snowboarder's wrist and readily conform to the user's wrist.

A further object of the present invention is to provide a wrap that surrounds a snowboarder's wrist twice to provide 720° coverage to give greater stability to the wrist and provide greater warmth to the snowboarder's hands.

A further object of the present invention is to provide a new and improved wrist guard which may be easily removed and applied to and from the user's hand and wrist.

A still further object of the present invention is to provide a new and improved wrist guard which is capable of adjustably securing and reinforcing the user's wrist in a position selected by the snowboarder as to selectively dispose the snowboarder's wrist in a desired position.

Still another object of the present invention is to provide a wrist guard which is provided with multiple flexible supports, above and below the wrist, and an adjustable fastening means for allowing the snowboarder comfort while, at the same time, providing support to the snowboarder's wrist in the event of a fall. The wrist support of the present invention balances rigidity and shock absorption rather than transmission of forces to the wrist, hand, elbow and shoulder of a user.

DESCRIPTION OF THE DRAWINGS

Various other objects, features and advantages and benefits of the present invention will be more fully appreciated from the following detailed description of a preferred embodiment when considered in conjunction with the accompanying drawings, in which like reference characters designate like or corresponding parts throughout the several views, and wherein:

FIG. 1 is a perspective view of an embodiment of the wrist guard of the present invention;

FIG. 2 is a top plan view of the exterior of the wrist guard;

FIG. 3 is a bottom plan view of the exterior of the wrist guard;

FIG. 4 is a cross-sectional view of the wrist guard in FIG. 2 along the line 4—4.

FIG. 5 is a cross-sectional view of the wrist guard in FIG. 2 along the line 5—5.

DETAILED DESCRIPTION OF THE PREFERRED EMBODIMENTS

Referring now to the drawings and more particularly to FIGS. 1 and 2, the overall wrist guard 10 of the disclosed embodiment has a body 12 of the wrist wrap 14 which is made of a flexible and stretchable material, preferably neoprene or an equivalent elastic material having similar warmth and flexibility characteristics. The stretchable material itself is between 1 mil to 4 mils in thickness and is sufficiently thin to allow easy stretching to cover the wrist in multiple layers. If too thin (under 1 mil), however, the wrist guard provides insufficient support. If too thick (over 4 mils), it becomes too bulky for the user. Thus, a 1 mil to 4 mil thickness range of neoprene was found to provide an acceptable balance between stretch, bulkiness and support. Other suitable materials include laminated foams, formed foams and formed neoprene. But because formed products tend to be too rigid, they are not as desirable as neoprene.

The body 12 may have a water-proof skin 13 and a cordura or equivalent covering for the pouches 40 and 42. Condura has been found to be a particularly useful material to cover the flexible supports or stays because it is abrasion-resistant and helps protect the stays form damage from snow and ice, which can have high abrasion tendencies. Other suitable materials include high-abrasion resistant fabrics.

The external surface of the body 12 may be decorated with any aesthetic design, such as shown at 16, that is desired to make the wrist band more attractive. The elastic properties of the body 12 provide control of the tightness and rigidity of the entire structure, as it generally conforms to the hand and wrist 15 of the snowboarder.

The wrist wrap has a support portion 18 made up of four individual stays and supports comprising a "fastener/brace portion" 20. The fastener/brace portion 20 of the disclosed wrist wrap has a fastening means such as the outer VELCRO fastener 22 and the inner VELCRO fastener 24. The inner hook and loop fastener, such as VELCRO-® fastener 24 is secured to the internal portion of the body (FIG. 3) and the outer hook and loop fastener, such as VELCRO® fastener 22 is secured to the external surface of the body (FIG. 2). Preferably, the hook and loop fastener, such as VELCRO® fasteners 22 and 24 are sewn to the wrist wrap by means of a heavy duty thread 26.

Any conventional fastening means could be used in place of the inner and outer hook and loop fastener, such as VELCRO® fasteners 22 and 24, such as snaps, buckles or buttons, so long as they secure the wrist wrap in a secure supporting configuration in use. Hook and loop fastener, such as VELCRO® is preferred, however, because it provides variable and easily-adjustable wrapping capability. The outer hook and loop fastener, such as VELCRO® fastener 22 and the inner hook and loop fastener, such as VELCRO® fastener 24 are positioned along the longitudinal axis A—A in such a manner that when the wrist guard 10 is wrapped around a snowboarder's wrist 15 the outer VELCRO fastener 22 aligns with the inner VELCRO fastener 24 such that the two hook and loop fastener, such as VELCRO® fasteners 22 and 24 connect.

The support portion 18 of wrist wrap 14 provides a majority of the stiffness, flexibility and support to the wrist guard 10. Most desirable, however, is a support structure that provides shock-absorbing capabilities. Support portion 18 also contains two circular holes, a right-hand thumb hole 32 and a left-hand thumb hole 34. The thumb holes 32 and 34 are made of sufficient size to accommodate various thumb sizes, as well as the glove of a snowboarder should the snowboarder prefer to wear the wrist guard 10 over the glove (not shown). The support portion 18 may also contain the marking "R" 33 to indicate right thumb hole 32 and the marking "L" 35 to indicate left thumb hole 34. The right-hand thumb hole 32 and the left-hand thumb hole 34 are positioned in symmetrical alignment which the longitudinal axis A—A of the wrist wrap 14 to allow for the wrist guard 10 to be worn on either the left or right hand of the snowboarder. The symmetrical alignment of the thumb holes 32 and 34 along the axis A—A permit the wrist guard 10 to function on either hand. The left-hand thumb hole 34 and the right-hand thumb hole 32 may be reinforced with a heavy-duty thread 36.

Support portion 18 also includes a palm support pouch 40 and a back support pouch 42 that are secured to the external surface and body of the wrist wrap. The palm support pouch 40 runs parallel to the central axis formed by the thumb holes 32 and 34 and is positioned such that when the snowboarder places either his left or right thumb through the corresponding left thumb hole 32 or right thumb hole 34, or the wrist guard 10, the palm support pouch 40 is positioned against the palm of the snowboarder's hand and the inner wrist. Similarly, the back support pouch 42 runs parallel to the central axis formed by the thumb holes 32 and 34 and is positioned such that when the snowboarder places either his or her left or right thumb through the corresponding left thumb hole 34 or right thumb hole 32 of the wrist guard 10, the back support pouch 42 is positioned against the back of the snowboarder's hand and the outer portion of the wrist. As with the thumb holes 32 and 34, the palm support pouch 40 and back support pouch 42 are symmetrical along with the axis A—A of the wrist guard 14 which permits the wrist guard to be worn on either the left or the right hand. The use of two holes in each wrist guard makes the guard reversible and interchangeable.

As can be seen in FIGS. 2, 3 and 4, the palm support pouch 40 contains a first chamber 44 and a second chamber 46, each of which contain a narrow, flexible, shock-absorbing support member 48. The back support pouch 42 likewise has a first chamber 50 and a second chamber 52 that secure support members 48. The narrow support members 48 are preferably 6 inches by ¾ inch by ¼ inch, but can have appropriate adjustments for varying hand size. Support members 48 are preferably constructed of a semi-flexible shock-absorbing ABS (acrylonitrile-butadiene-styrene copolymer) plastic. ABS plastics provide flexibility and shock-absorption in the thickness range desired. In addition, such plastics are shatter-resistant at lower temperatures and maintain flexibility at temperatures associated with snowboarding activities. Other shatter-resistant plastics include ethylene vinyl acetate (EVA) copolymers, such as Du Pont's SURLYN plastic or other plastics capable of maintaining flexibility at low temperatures. The flexible supports 48 have a memory and can snap back into their original position after flexing. They are typically between ¼" and ½" in thickness and their length will vary depending upon the hand size of the user.

Solid moldable plastics that are rigid and non-flexible tend to transmit, rather than absorb, forces and are not desirable. Thus, the plastic stays or supports 48 help distribute and absorb forces caused by a fall. They balance rigidity with shock absorption and minimize the transmission of forces to the hand, wrist, elbow and shoulder.

If made of a rigid, non-flexible material, the stays or supports 48 tend to transmit, rather than absorb, forces. By absorbing shock and forces, the supports 48 minimize damage and injury to the wrist and hand. This also helps to minimize injury to the elbow and shoulder. Rigid plastics will transmit forces to the elbow (if the arm is bent) or to the shoulder (if the arm is locked). This, of course, is undesirable. As shown, the narrow support members 48 are held in the various compartments 44, 46, 50 and 52 of the palm support pouch 40 and the back support pouch 42 by stitching 54. The compartments 44, 46, 50 and 52 are preferably slightly larger than the narrow support members 48 to provide some movement within the various pouch compartments 44, 46, 50 and 52.

By using two supports 44, 46, rather than a single support, on each side improves flexibility. In addition, there is an improved distribution of forces and shock dissipation.

In use, the wearer must first choose to use the wrist guard 10 on either his or her left or right hand. In the example shown, the snowboarder has chosen to use the wrist guard on the left hand. The snowboarder places his or her left thumb 30 through the left thumb hole 34 having the "L" marking 35. The palm support pouch 40 will rest against the palm and inner wrist of the snowboarder's left hand. The palm support pouch 40 has a first chamber 44 and a second chamber 46 that each hold a flexible support member 48. Thus, the palm support pouch 40 can house more than one support member 48. Support members 48 in the first 44 and second chamber 46 are semi-flexible, but in combination, have ample longitudinal stiffness to support the wrist of a snowboarder during a fall. The balance between rigidity and flexibility allows a shock-absorbing effect that dissipates and distributes forces from a fall. The palm support pouch 40 may bend in the transverse direction since the support members 48 located in the first 44 and second chamber 46 provide no resistance in the transverse direction along the division 45 between the first 44 and second chamber 46. While the palm support pouch 40 provides stiffness in the longitudinal direction along support members 48, it provides only limited stiffness in transverse direction along support members 48. Thus, the support members 48 in the first 44 and second chamber 46 of the palm support pouch 40 may easily conform to the particular features of the user's hand and wrist while maintaining the necessary stiffness to help prevent an injury to the user's wrist in the event of a fall.

The back pouch 42 fits along the back of the user's wrist and hand. As with the palm support pouch 40, the back support pouch 42 has a first 50 and second chamber 52 which each house support members 48. While the support members 48 in the first 50 and second chamber 52 of the back support pouch 42 provides stiffness in the longitudinal direction, the back support pouch 42 provides only limited stiffness the transverse direction along the narrow support members 48. The support members 48 in the first 50 and second chamber 52 of the back support pouch 42 may easily conform to the particular features of the user's hand and wrist while maintaining adequate stiffness to help prevent an injury to the user's wrist in the event of a fall. The back supports keep the wrist from bending too far backward. The palm supports brace the wrist and hand and help absorb and distribute forces from a fall.

The supports 48 typically extend to a point slightly below the base of the fingers 17 at one end and to a point 2 inches to 4 inches below the wrist bone (toward the elbow) in the other. This has been found to provide a good balance of support and user flexibility. Snowboarders need free use of their hands for buckling and unbuckling their bindings. Thus, a support that extends to the base of the fingers or above would unduly limit hand mobility. By extending the support 2 inches to 4 inches below the wrist bone, adequate support is provided for a sudden backward flex of the wrist.

The wrist guard 10 of the disclosed embodiment also provides support above and below the wrist, which minimizes sprains, breaks and bruises to the wrist and hand areas. Side-to-side support is also provided by the tightness of the wrap. Although two separate supports 48 are shown above and below the wrist, a single support could be used above or below the wrist, but is not preferred. The use of two smaller supports was found desirable because it provides more lateral flexibility.

Once the snowboarder has placed his or her thumb 19 in the thumb hole 34 and properly aligned the palm support pouch 40 along the palm and inner wrist and the back support pouch 42 along the back of the hand and outer wrist, the user secures the fastening portion 20 around the palm support pouch 40; around the right thumb hole 32 and the left thumb hole 34; around the back support pouch 42; and then securing the inner hook and loop fastener, such as VELCRO® fastener 24 to the outer VELCRO fastener 22. The inner VELCRO fastener 24 should generally line up with the palm support pouch 40. It is preferred that the support portion of the wrist wrap 14 provide 360° coverage of the wrist and that the fastener portion 20 of the wrist wrap provide 360° coverage of the wrist to provide 720° of total coverage. The fastener portion 20 of the wrist wrap 14, when secured by the outer VELCRO fastener 22 and the inner VELCRO fastener 24, provided added support to the palm support pouch 40 and the back support pouch 42. The thumb hole 34 also prevents the wrist guard 10 from sliding along the user's wrist.

In use, the entire wrist guard assembly forms a snug and secure fit around the snowboarder's wrist 15 which will assist in preventing the adverse rotation of the wrist 15 and any subsequent injury that could result from a fall. By using an integral one-piece construction, the described wrist guard 10 is more user-friendly and, hence, will be used more frequently. The one-piece construction also permits variable wrapping forces to the level required by an individual user. Also, the use of fewer parts improves reliability and the useful life of the wrist guard 10.

The invention has, thus, been illustrated and described in what is presently considered to be a preferred embodiment. It is recognized, however, that departures may readily be made from this embodiment without departing from the spirit and scope of the invention as defined in the claims.

What is claimed is:

1. A wrist guard for interchangeably protecting either the left or right wrist area of a user, comprising:

a body portion made of a stretchable material having a palm support portion, a back support portion, a thumb retention portion and a fastener portion;

a palm support pouch secured to said palm support portion wherein said palm support portion has a first palm support chamber and a second palm support chamber;

a plurality of flexible palm support members that render their original shape after flexing secured by said first palm support chamber and second palm support chamber wherein said palm support members have a sufficient stiffness to provide support to said wrist area but are flexible enough to absorb and dissipate forces;

a back support pouch secured to said back support portion wherein said back support pouch has a first back support chamber and a second back support chamber;

a plurality of flexible back support members with memory secured by said first back support chamber and said second back support chamber wherein said back support members also have a sufficient stiffness to provide support to said wrist area but are flexible enough to absorb and dissipate forces;

said thumb retention portion having a plurality of thumb holes to accommodate either the left or the right thumb of said snowboarder; and a fastener secured to said fastener portion wherein said palm support members and said back support members can be secured.

2. The wrist guard of claim 1 wherein said flexible support members extend from a point below the base of the fingers to a point 2 to 4 inches below the wrist bone and are made of a semi-flexible, shock-absorbing plastic.

3. The wrist guard of claims 1 and 2 wherein the stretchable material is between 1 and 4 mils in thickness.

4. The wrist guard of claims 1 and 2 wherein the support pouches are made of an abrasion-resistant fabric and being made of ABS or EVA plastic.

5. The wrist guard of claims 1 and 2 wherein the flexible palm support members and the flexible back support members are disposed below the palm and are disposed above the hand.

6. The wrist guard of claims 1 and 2 wherein said fastener comprises hook and loop fasteners.

7. A one-piece interchangeable wrist support structure for absorbing and distributing forces from a fall comprising:

a one-piece body made of a stretchable material suitable for wrapping around the wrist of a wearer;

at least two holes in said flexible body to accommodate the thumb of a left or right hand; and back and palm support structures that render the original shape after flexing and positioned along the palm and the back of the wearer's hand to provide flexible shock-absorbing support for the wrist and hand of a wearer, said back and palm support structures being enclosed in protective coverings and being located in a manner to provide easy movement of a user's hands while, at the same time, providing protection against excessive backward or forward flexion of the wrist.

8. The one-piece wrist support of claim 6 wherein the body is 1 to 4 mils in thickness and is capable of providing a 720° wrap around the wrist and hand.

9. The support of claims 7 and 8 wherein the body is secured by hook and loop fasteners.

10. The support of claim 7 wherein two lower and two upper support structures are used, said support structures being enclosed in abrasion resisting covers and being made of ABS or EVA plastic.

\* \* \* \* \*